Patented Jan. 15, 1935                                           1,987,861

UNITED STATES PATENT OFFICE 1,987,861

CERAMIC BONDED ABRASIVE ARTICLE

Lowell H. Milligan and David Armitage, Worcester, Mass., assignors to Norton Company, Worcester, Mass., a corporation of Massachusetts No Drawing. Application November 8, 1933, Serial No. 697,173

18 Claims. (Cl. 51—278)

This invention relates to the manufacture of articles of ceramic bonded granular material, such as abrasive articles, refractory bodies, porous plates, tiles etc.

Various articles of commerce are customarily made of refractory granular material bonded together by a vitrified bond. For example, a grinding wheel or a refractory plate may be made of crystalline alumina or silicon carbide granules bonded by a vitrified ceramic material fired in a ceramic kiln to a temperature at which the mixture becomes vitrified. Bonds which will mature in the vicinity of standard pyrometric cone 12 and are commonly used for the manufacture of abrasive bodies may be made of mixtures containing feldspar, ball clay, slip clay, kaolin, flint, etc. In such compositions, the plastic clays serve to render the mixtures moldable in the green state. Fluxes present in the natural materials cause the bond to mature upon firing, by the formation of intersticial cementing glass phases. Typical chemical compositions of such bonds, after firing, are as follows:

Table I

|  | Bond for aluminous abrasives | Bond for silicon carbide abrasives |
|---|---|---|
|  | Percent | Percent |
| $SiO_2$ | 64.0 | 70.7 |
| $Al_2O_3$ | 17.6 | 19.9 |
| $Fe_2O_3$ | 5.3 | 0.6 |
| $MgO$ | 2.6 | 0.2 |
| $CaO$ | 5.0 | 0.4 |
| $Na_2O$ | 1.5 | 2.1 |
| $K_2O$ | 2.8 | 5.5 |
| $TiO_2$ | 1.2 | 0.6 |
| Total | 100.0 | 100.0 |

In these bonds, soda, potash, lime, magnesia and iron oxide constitute the chief fluxing ingredients. Sometimes boric oxide is present as an added constituent. Various modifications have been made in such bonds for the purpose of rendering them more useful in a given art such, for example, as are set forth in the patent to Saunders et al. No. 1,829,761, in accordance with which the ceramic bond ingredients may be so chosen that the bond will have substantially the same coefficient of expansion as that of crystalline alumina throughout a considerable range after the bond has been matured. Likewise, the composition of such bonds may be selected to avoid detrimental effects that may result from various ingredients of the bond, such as is set forth in the U. S. patent to Milligan and Quick No. 1,910,031. The utility of a ceramic bond depends upon many other characteristics; but in general it is necessary that such a bond render the mixture of grains and raw bond moldable to a desired shape while in the green condition, and that the granular material in the final product be held together in a strong, coherent structure which will resist the stresses set up by differential temperatures and the centrifugal force involved in a grinding operation. Also, the bonded structure should have sufficient elasticity, toughness, and strength to satisfy the requirements of the industry, and it should not possess detrimental characteristics, such as solubility in water during grinding or volatility, swelling or deleterious crystallization during the step of maturing the bond.

It is the primary object of this invention to provide an improved article of ceramic bonded granular material which will satisfy the above specified conditions and will be highly useful in various arts.

A further object of this invention is to provide a method of making and a composition for such an article of ceramic bonded granular material which will present many advantages over similar articles of the prior art. Further objects will be apparent in the following disclosure.

As the result of theoretical study and practical experimentation, we have now discovered that the use of the phosphate radical in a ceramic silicate bond for granular refractory material will bestow desirable properties upon the bonded article. Such a bond preferably comprises phosphorus pentoxide in conjunction with silica and alumina, and these constituents may be in various proportions with relation to each other. It is preferred, however, that the alumina be present in amount equal to or greater than the molecular ratio of one mol, or gram molecular weight, of $Al_2O_3$ to one mol of $P_2O_5$, which is the ratio present in aluminum phosphate ($AlPO_4$). The amount of phosphorus oxide used in the bond may be widely varied, but it should be present in a material amount sufficient to add desirable properties to the bond. In certain instances, an amount as low as 1.0% by weight of the bond has been advantageous, but as hereinafter specified, it is usually preferable that the phosphorus, calculated as $P_2O_5$, be present in somewhat larger amounts, and it is even possible to use as much as 40% or more. The amount of silica present will be such that an intersticial glassy cementing phase will be formed in cementing relationship to the granular material being bonded, when the bond is developed under proper heat treatment.

Phosphates may be considered as compounds formed by the union of phosphorus pentoxide with other (usually more basic) oxides. Thus aluminum phosphate may be written $Al_2O_3.P_2O_5$. Phosphorus pentoxide itself is a white deliquescent solid, which reacts readily with water to form phosphoric acid. Phosphorus pentoxide, when heated alone, sublimes at temperatures below a red heat. Phosphorus pentoxide is, therefore, not of value as a bond of the kind being considered, when used alone by derivation from such compounds as phorphoric acid or ammonium phosphate, and admixed with granular material, such as alumina, because it either is lost by volatilization in the kiln, or seriously attacks the granular abrasive material, neither of which effect is desirable in the present instance. Phosphoric oxide is of value as a constituent of ceramic bonds as herein defined only when the bond compositions chosen are such as to retain the phosphorus pentoxide during the heating cycle required to mature the bond of the products.

In bond compositions as hereinafter described, we have found that there is little or no volatilization of phosphorus pentoxide in the kiln. This is advantageous in that a range of varying firing treatments can be employed without seriously affecting the chemical composition of the bond actually present in a given final product. The phosphate radical in conjunction with alumina in silicate compositions is indicated by our experiments to function somewhat as a flux, although aluminum phosphate itself is a refractory material and cannot function alone as a bond in the manner described in the present invention. In silicate compositions, however, as will be hereinafter described, we have discovered that aluminum phosphate often causes a given degree of fluidity to be obtained at lower temperatures than would be the case if it were absent.

By silicate compositions and ceramic silicate bonds is meant those compositions that contain silica as a chemical ingredient, no matter how the silica was introduced, whether in the elementary state as quartz, etc., or derived from silicates, clays, feldspars, etc., and without reference to the chemical or crystallographic state of the silica as a constituent of the final bond.

Any fluxing action attributable to aluminium phosphate in ceramic silicate bonds permits lower heat treatment in the kiln and results in a saving of fuel in firing such products, prolongs the life of kiln refractories, and tends to shorten the total time required for the firing operation. In certain of the compositions that may be employed, the tendency for deleterious crystallization in the bond is reduced.

The phosphate radical in conjunction with alumina tends to confer an increased water resistance upon compositions containing it. This is advantageous in that many grinding wheels and other products composed of granules cemented together with vitrified bonds are used in the wet condition, and changes in the strength of the bonding caused by the action of water are, of course, undesirable.

Bonds of much higher coefficient of expansion than the granules being bonded are unsatisfactory because of a tendency in the products for sensitiveness to thermal shock, or because of a tendency for crazing of the bond to take place with resultant weakening of the structure. In this condition, fluxes like soda and potash are often undesirable because they tend to raise the expansivity of the bond considerably. The use of phosphate in conjunction with alumina, as a flux, is free from this disadvantage because there is usually little or no tendency to raise the expansivity of the bond.

A further advantage in the use of phosphate in conjunction with alumina is that vitrified bonds having low moduli of elasticity are produced, and these are, therefore, more resistant to fracture from mechanical shock than are ordinary bonds of high modulus of elasticity. A low modulus of elasticity means that the new bonds will deflect more under a given load, and when two bonds of the same mechanical strength are considered, a lower modulus of elasticity corresponds to a tougher product because there will be greater deflection before rupture. In a similar manner, when a bond of low modulus of elasticity is deflected a given amount by an applied load, it will be stressed to a lesser degree and will be less likely to fracture. In some cases of products made with the new type bonds, we have actually found that increased mechanical strength has also accompanied the use of phosphate with alumina.

This invention, therefore, contemplates in general the production of an article consisting of granular refractory material bonded with a ceramic silicate bond containing phosphoric oxide and alumina. The bond may be glassy or of the porcelanic or refractory types, and other oxides such as those of iron, magnesium, calcium, sodium, potassium, titanium, boron, and many other elements may be present as may be desired, and may or may not have combined chemically into one or more complex crystalline compounds or glasses. Such a product may be made by molding refractory abrasive granules with raw bonds comprising mixtures of phosphates with clays, feldspars, flint, alumina or other ceramic materials, and maturing the bond by firing in a furnace or kiln.

The phosphate radical may be employed in various forms, depending upon the preferred kiln treatment and the nature of the granular material to be bonded, as well as the other bonding ingredients present. It may be added as phosphoric acid or as various salts, such as ammonium phosphate, sodium phosphate, or aluminum phosphate. Natural mineral sources of phosphate may be employed, such as wavellite, which is essentially aluminium phosphate, or amblygonite, which contains phosphate, alumina, and alkalis.

Some or all of the bond ingredients may be used in the raw state in the molding of the mixture of the refractory grains. Likewise, some of the bond materials may be fritted together into a glass and the powdered glass mixed with the other bond ingredients prior to mixing with the granular material, or, indeed, all of the bond materials may be initially made into a glass, which is powdered and used with a temporary plastic bond suitable for shaping the bond and grains into a molded body. Silica and alumina may be derived from such natural minerals as clays and feldspars, or may be added in the oxide form as flint, and alumina or aluminum hydrate. Fluxes such as soda, potash, iron oxide, lime and magnesia, may be derived from natural sources or added in other chemical combinations as desired. Boric oxide may be added as boric acid, borax, or as a natural mineral such as Ulexite containing boric oxide, soda and lime. Titania, and various other oxides present in ceramic bonds, may also be added in any suitable form, as is well understood in the art. There is no limitation as to the choice of oxides or other suitable compounds, since each type of bond will necessarily be made up in accordance with the desired characteristics of the fired article. It is, however, desirable that the ingredients of the bond be so chosen that the entire bond or the intersticial glass cement, which constitutes the real bonding agent in a porcelanic mixture, be a glassy phase containing silica and the phosphate radical, or phosphorus pentoxide in conjunction with alumina.

The use of a high calcium content, however, in connection with the phosphate, results in bonds that lack many of the desirable properties otherwise obtained by our invention, and it is, therefore, considered unwise to add all of the phosphate as calcium phosphate, or to have a calcium content present in the bond sufficient to correspond to the total amount of $P_2O_5$ present in the molecular ratio of calcium phosphate, namely 3 CaO to 1 $P_2O_5$. That is to say, there should be sufficient phosphoric oxide present, relative to the calcium oxide and alumina content, so that the desirable properties attributable to the presence of phosphoric oxide with alumina are developed.

It will be appreciated that the alumina may, in certain cases, be derived in part or wholly from the aluminous refractory material which is being bonded, such as where the refractory material contains finely divided alumina which under the firing conditions employed may be available to dissolve to some extent in or otherwise become a part of the bond. In such a case, sufficient silica or silicates are employed with the phosphorus containing material to form the desired glassy phase. It is, therefore, to be understood that any alumina thus derived from the granular material is to be considered as a part of the bond, although not introduced as such. Similarly, the silica may be derived wholly or in part from siliceous, refractory granular material which is being bonded.

The purposeful use of phosphoric oxide with alumina to impart new and desirable properties to ceramic silicate bonds should be clearly distinguished from any minor contamination of bond materials or bonds with phosphoric oxide that may accidentally have occurred in the past. Small amounts of phosphates are widely distributed in nature, but are usually so unimportant that $P_2O_5$, which may be present to the extent of a few tenths of a per cent, is often not determined when chemical analyses of materials are made. Such amounts are too small to have any material or beneficial effect on bonds accidentally containing them. The claims in the present case are to be interpreted as covering the presence of a material amount of $P_2O_5$, and preferably over 1% by weight, in the bond.

The following typical examples will illustrate the nature of this invention. As shown by the following table, two bonds for abrasive grains were made up of slip clay and ball clay, the first bond having no phosphoric oxide therein.

*Table II*

|  | #1 bond | #2 bond |
|---|---|---|
|  | Parts | Parts |
| Slip clays | 75 | 75 |
| Ball clays | 25 | 25 |
| Aluminium phosphate | 0 | 20 |
| Total | 100 | 120 |

*Calculated compositions*

|  | #1 bond | #2 bond |
|---|---|---|
|  | Percent | Percent |
| $SiO_2$ | 65.0 | 53.1 |
| $Al_2O_3$ | 17.4 | 21.9 |
| $Fe_2O_3$ | 4.9 | 4.0 |
| MgO | 2.7 | 2.3 |
| CaO | 4.9 | 4.0 |
| $Na_2O$ | 1.0 | 0.9 |
| $K_2O$ | 2.8 | 2.3 |
| $TiO_2$ | 1.3 | 1.0 |
| $P_2O_5$ | 0.0 | 10.5 |
| Total | 100.0 | 100.0 |

These two bonds were employed with crystalline alumina abrasive of #16 grit size in the proportion of 3½ ounces of raw bond to 16 ounces of the abrasive grain, a little water and dextrine being added to give the mixture increased moldability and green strength. Four bars were pressed from each of these compositions; and after firing in a kiln to mature the bond, the bars were tested for their cross-bending strength. The first three bars were tested in a dry condition, while the fourth bar of each kind was soaked in an alkaline solution and then washed with water for a number of days, after which it was dried and tested. The results obtained for the moduli of rupture were:

*Table III*

| Bar No. | #1 bond bars | #2 bond bars |
|---|---|---|
|  | Lbs. sq. in. | Lbs. sq. in. |
| 1 | 1315 | 2100 |
| 2 | 1205 | 2100 |
| 3 | 1182 | 2050 |
| Average | 1234 | 2083 |
| 4 (alkali and water treated) | 964 | 1937 |

It will be seen from Table III that the bars made with the #2 bond containing the phosphate averaged about 69% stronger than those made with the #1 bond of the old type. Also, the alkali and water treatment reduced the strength of a bar made with the #1 bond by about 22% compared with the strength of similar untreated bars, whereas the reduction in strength due to treatment of a #2 bond bar was only about 7% under similar conditions. It is probable that the increase in strength obtained in this case by the use of aluminium phosphate in the bond is greater than ordinarily would be expected, but serves as a striking example of an advantageous use of the new type bond.

A further demonstration of this invention, with particular reference to the fluxing characteristics of the phosphate radical in conjunction with alumina, is illustrated in the following series of tables and their accompanying explanations. In each case, the bonds were molded into pills and fired upon refractory plates, and various conclusions were drawn as to their fluidity at the kiln treatment employed and their suitability for use as a bond. A few of the typical compositions employed and results obtained by firing such pills at a temperature in the vicinity of 1125° C. are as follows:

Table IV

|  | Base #A1 | #A2 | #A3 |
|---|---|---|---|
|  | Percent | Percent | Percent |
| $SiO_2$ | 66.0 | 48.1 | 19.0 |
| $Al_2O_3$ | 19.2 | 24.8 | 34.2 |
| $Fe_2O_3$ | 0.3 | 0.3 | 0.3 |
| MgO | 2.3 | 2.3 | 2.3 |
| CaO | 2.4 | 2.4 | 2.4 |
| $Na_2O$ | 2.9 | 2.9 | 2.9 |
| $K_2O$ | 6.3 | 4.0 | 0.3 |
| $TiO_2$ | 0.6 | 0.6 | 0.6 |
| $P_2O_5$ | 0.0 | 14.6 | 38.0 |
| Total | 100.0 | 100.0 | 100.0 |

In the above Table IV, the column labelled "Base #A1" gives the chemical analysis of a bond which does not contain phosphorus pentoxide; while the columns labelled #A2 and #A3 give varying formulae in which the phosphorus oxide ranges from 14.6% to 38%, and the alumina also has been increased relative to the amount present in the base #A1 mixture. These three examples were taken from a long series obtained by substituting aluminium phosphate in increasing amounts for equal weights of feldspar in the base #A1 mixture. These bonds were of somewhat porcelanic appearance. The fluidity increased at first as more aluminium phosphate was added, until it reached a maximum at approximately the composition of #A2, after which the fluidity decreased with an increase of aluminum phosphate. It is apparent, therefore, that although the greatest fluidity is developed at or near the #A2 composition, a large leeway on both sides of this is available, depending upon the bonding characteristics desired. For example, for more refractory bodies, the bond #A3 might be suitable, and greater fluidity could be obtained by increasing the temperature of firing.

Table V

|  | Base #B1 | #B2 | #B3 |
|---|---|---|---|
|  | Percent | Percent | Percent |
| $SiO_2$ | 62.0 | 49.3 | 19.8 |
| $Al_2O_3$ | 18.0 | 22.1 | 31.4 |
| $Fe_2O_3$ | 0.3 | 0.3 | 0.3 |
| MgO | 2.3 | 2.3 | 2.3 |
| CaO | 2.5 | 2.5 | 2.5 |
| $Na_2O$ | 4.5 | 4.5 | 4.5 |
| $K_2O$ | 5.3 | 4.0 | 0.5 |
| $TiO_2$ | 0.6 | 0.6 | 0.6 |
| $P_2O_5$ | 0.0 | 9.9 | 33.6 |
| $B_2O_3$ | 4.5 | 4.5 | 4.5 |
| Total | 100.0 | 100.0 | 100.0 |

In the above Table V, the base mixture contained boron oxide in addition to the ingredients found in Table IV. The boron content was held constant in this series. The base mixture #B1 is considerably more fluid than the base #A1. The addition of phosphate made the mixture more fluid up to a maximum fluidity in the vicinity of the composition #B2. This particular composition was of a very glassy nature under the kiln firing temperatures employed. With an increasing amount of phosphorous oxide above composition #B2, the fluidity decreased. The composition represented by #B3 was relatively refractory under the particular firing conditions employed.

Table VI

|  | Base #C1 | #C2 | #C3 |
|---|---|---|---|
|  | Percent | Percent | Percent |
| $SiO_2$ | 57.0 | 44.3 | 29.7 |
| $Al_2O_3$ | 17.0 | 20.5 | 24.8 |
| $Fe_2O_3$ | 0.3 | 0.3 | 0.3 |
| MgO | 2.5 | 2.5 | 2.5 |
| CaO | 2.7 | 2.7 | 2.7 |
| $Na_2O$ | 6.0 | 5.7 | 3.5 |
| $K_2O$ | 5.0 | 3.3 | 1.3 |
| $TiO_2$ | 0.7 | 0.7 | 0.7 |
| $P_2O_5$ | 0.0 | 10.4 | 23.5 |
| $B_2O_3$ | 8.8 | 9.6 | 11.0 |
| Total | 100.0 | 100.0 | 100.0 |

In a further series of compositions represented by Table VI, the phosphate was added as a monoammonium phosphate, and some aluminium hydrate was employed with it, but the ratio of added $Al_2O_3$ to $P_2O_5$ was only 75% of that required for the compound, $AlPO_4$. Here again, three of the series ranging from 0 to 23.5% of $P_2O_5$ are given. The greatest fluidity was obtained in the vicinity of the composition of #C2, which was quite glassy, while #C3 was so refractory under the firing conditions employed that higher firing temperatures would be desirable for it.

Table VII

|  | Base #D1 | #D2 | #D3 |
|---|---|---|---|
|  | Percent | Percent | Percent |
| $SiO_2$ | 42.6 | 38.5 | 34.8 |
| $Al_2O_3$ | 16.0 | 24.0 | 31.2 |
| $Fe_2O_3$ | 0.3 | 0.3 | 0.3 |
| MgO | 2.8 | 2.5 | 2.3 |
| CaO | 2.8 | 2.5 | 2.3 |
| $Na_2O$ | 5.6 | 5.1 | 4.6 |
| $K_2O$ | 2.5 | 2.3 | 2.0 |
| $TiO_2$ | 0.9 | 0.8 | 0.8 |
| $P_2O_5$ | 16.2 | 14.7 | 13.3 |
| $B_2O_3$ | 10.3 | 9.3 | 8.4 |
| Total | 100.0 | 100.0 | 100.0 |

Alumina itself is a refractory material but all the bonds in the above Table VII were glassy bonds in spite of their high alumina content. In accordance with this invention, it is possible to have a very high alumina content, and yet have adequate fluidity at temperatures which are not too high for use in bonding operations. It was found in this series of experiments that a bond containing phosphate in conjunction with some alumina was first rendered more fluid by additions of alumina and then more viscous by larger additions. The lower members of the bond series containing the smaller amounts of alumina were translucent glasses, while the higher members were entirely transparent but appeared to contain a little alumina that had not yet gone into solution. Still more alumina than was actually found in the highest member could undoubtedly have been added, if desired.

Table VIII

|  | Base #E1 | #E2 | #E3 |
|---|---|---|---|
|  | Percent | Percent | Percent |
| $SiO_2$ | 53.0 | 32.3 | 24.2 |
| $Al_2O_3$ | 14.5 | 20.6 | 22.8 |
| $Fe_2O_3$ | 0.2 | 0.2 | 0.2 |
| MgO | 1.5 | 1.5 | 1.5 |
| CaO | 1.6 | 1.6 | 1.6 |
| $Na_2O$ | 4.2 | 4.2 | 4.2 |
| $K_2O$ | 5.2 | 2.6 | 1.7 |
| $TiO_2$ | 0.4 | 0.4 | 0.4 |
| $P_2O_5$ | 0.0 | 15.6 | 21.8 |
| $B_2O_3$ | 4.2 | 4.2 | 4.2 |
| CdO | 15.2 | 16.8 | 17.4 |
| Total | 100.0 | 100.0 | 100.0 |

Another series of bonds containing both cadmium oxide and boron trioxide was studied, and the calculated chemical analyses of three of the fired products in the series are given in the above Table VIII. In each of these compositions, aluminium phosphate was substituted in varying amounts for the feldspar of the original mixture. The base #E1 was a white, semi-opaque glass. The fluidity increased with the addition of more phosphorus pentoxide until the bond reached approximately the composition of #E2, when the bond was a practically transparent, colorless glass. Further increase of the phosphorus up to #E3 showed increasing amounts of undissolved material under the firing conditions used, and hence a more refractory bond.

It will be appreciated that the variations in bond formulae are innumerable, and that this invention is not limited in its scope to the bond formulae herein specified as examples. This invention is intended to cover all ceramic bonds containing phosphoric oxide in conjunction with alumina and silica, which are adapted for cementing together or bonding granular material that is sufficiently refractory to resist the temperature of the firing operation required for maturing the bond selected.

The bonds containing phosphoric oxide and alumina are particularly adapted for bonding crystalline alumina or other aluminous abrasive materials containing a high alumina content. In such cases, it is preferable to have the bonds so constituted that alumina is present in them in amount sufficient or more than sufficient to combine with all of the phosphoric oxide. Hence, where such a composition is used to bond crystalline alumina abrasive granules, the chemical reaction between the phosphoric oxide of the bond and the alumina abrasive granules during the firing operation is reduced to a minimum, because the phosphoric oxide is already saturated with alumina. Since it is possible to make bonds of the new type that have a very high alumina content, it is apparent that the percentage effect on physical or strength properties of the bond of any given amount of alumina, taken up from aluminous abrasive grain, is likely to be less than for ordinary bonds because the amount of alumina taken up will be a smaller percentage of the alumina already present in the bond.

*Table IX*

|  | Bond F | Bond G |
|---|---|---|
|  | Percent | Percent |
| $SiO_2$ | 65.7 | 38.8 |
| $Al_2O_3$ | 18.5 | 26.6 |
| $Fe_2O_3$ | 3.9 | 0.4 |
| MgO | 1.8 | 2.5 |
| CaO | 2.8 | 3.2 |
| $Na_2O$ | 1.7 | 4.0 |
| $K_2O$ | 4.8 | 2.3 |
| $P_2O_5$ |  | 13.9 |
| $TiO_2$ | 0.9 | 0.9 |
| $B_2O_3$ |  | 6.9 |

In order to demonstrate some of the advantages of ceramic bonds containing phosphoric oxide for bonding aluminous abrasives, the above data of Table IX may be selected. Two sets of bars for testing purposes were made of crystalline alumina abrasive of #16 grit size, one set being made of a ceramic bond of the composition F, which bond is of the ordinary commercial type, and the other set of the composition G, which is of the new type. Each set of bars was made with increasing amounts of bond. These bars were fired in a ceramic kiln under proper heat treatment to convert the raw bonds into glasses of proper fluidity, and they were then tested for modulus of rupture on an Olsen testing machine. It was found that the strength increased as more of the bond was used, and the actual values ran from 1600 to 2700 lbs. per sq. in. for the bars made with the bond F and 2500 to 3700 lbs. per sq. in. for the bars made with the bond G. Hence, the bond G containing phosphorus and boron oxides gave bars that were from 40% to 50% stronger than the bars made without these ingredients.

Similarly, two sets of grinding wheels were made from these two bonds of Table IX, these wheels being 24" in diameter by 2" thick with a 2" hole. These wheels were speed tested to destruction, with the results shown in Table X.

*Table X*

| Grain, grade, and structure designation | Bond | Bursting speed (s. f. p. m.) |
|---|---|---|
| 16–R5 | F | 14,640 |
| 16–R5 | G | 16,200 |
| 16–T5 | F | 14,900 |
| 16–T5 | G | 17,020 |

Each of these wheels was made of abrasive of 16 grit size and bonded to form the Norton #5 structure, the grade hardness being R in the first case and T in the second case on the Norton scale of hardness. It will be seen that the G bond containing phosphoric oxide was much more resistant to centrifugal force. Since the strength is proportional to the square of the bursting speed, it will be seen that the wheels made with the G bond were about 25% stronger than those made with the F bond. Actual grinding tests under conditions of extremely heavy and severe usage have shown that the wheels made with the G bond cut in an excellent manner and were less liable to breakage from the heat of grinding than were the similar wheels made with the F bond.

It is difficult to obtain accurate figures for the mechanical strength of bonds alone, but the resistance to mechanical abrasion has been determined under definite standardized conditions; and it has been found that a typical composition of the new type containing phosphoric oxide and alumina gave a bond glass that was about 1.8 times as resistant to abrasion as was window glass under the same conditions.

By a proper choice of bonds containing phosphoric oxide, it is possible to combine the advantageous properties which are inherent in such bonds with the desirable features of bonds set forth in the prior patent to Saunders et al. No. 1,829,761, which requires that the bond have approximately the same coefficient of expansion as that of the granular material which is to be bonded. The use of phosphoric oxide with alumina in the bond has little or no tendency to raise the expansivity of the bond. Hence, a bond which has substantially the same coefficient of expansion as that of the grains may be provided by the present invention when desired. Likewise, bonds that avoid the deleterious swelling due to iron oxide, as specified in the prior patent to Milligan and Quick No. 1,910,031, are within the scope of the present invention.

The examples given in Tables IX and X referred to bodies of hard grade made with coarse granular material, but it is evident to one skilled in this art that the softer grades are obtained by merely varying the relative proportions of the granular material and the bond, and that finer grit sizes may also be used. It will also be understood that the process for maturing the bond, as well as the composition of the bond, may be varied, depending upon the kind of abrasive employed, the grit sizes, the size and shape of the article to be manufactured, the type of the furnace employed, and various other factors; and that it is also possible to carry out the process in a manner such that the volume percentages of the abrasive, bond and pores in the finished article are predetermined.

In the manufacture of articles in accordance with this invention, various general practices well known to those who engage in ceramic arts are, of course, applicable and need not be described herein. For instance, the bond materials should be in a suitable state of subdivision and a suitable vehicle is usually employed with the mixture of bond ingredients and abrasive grains in order to aid in forming the article. This is customarily water, although other liquids or solutions may be employed, and for some purposes grease is advantageous. Less liquid is required for mixtures to be pressed in a mold or extruded through a die than for those that are puddled or cast. It is often desirable that the bond have a certain amount of plastic properties in order to render the mixtures moldable in the green state. When raw bond mixtures are chosen that of themselves have little or no plastic qualities, it is often possible and desirable to add such materials as plastic clay, alginates, starch pastes, or other similar materials in order to increase the moldability or pouring properties of the mixtures. Similarly, temporary binders are often employed to give green strength to the articles before the permanent bond has been developed. These may consist of substances which disappear or are burned out during the firing operation to which the articles are subjected, such as dextrine, molasses, Lignone, and many other materials, or which initially function in a temporary way only to later intermingle with other constituents of the raw bond mixture and aid in the formation of the permanent bond, such a material as, for example, sodium silicate being in this latter class. Indeed, in connection with the type of bonds covered by the present invention, it is often possible to select the raw materials so that a certain amount of setting-up action involving the phosphate radical takes place during the normal drying to which the "green" articles are submitted before firing and gives green strength prior to the development of the interstitial glassy cementing phase upon firing.

The interstitial glassy cementing phase that is developed by heat is the real bonding agent that is present in the final fired article. In this phase, the fluxes and also other ingredients that may have been taken into solution in it, under the influence of heat, have softened and intermingled. This glassy phase then serves to cement together undissolved bond constituents and together with such undissolved constituents forms what we normally refer to as the bond of the article. Thus, the bond that holds the abrasive grains together is constituted of the intersticial glassy cementing glassy cementing phase and undissolved constituents, the relative amounts of which will depend upon the initial composition, the heat treatment and other factors; or, indeed, the intersticial glassy cementing phase may, during the firing operation, form a solution with all the other bond constituents, in which case it alone forms the bond of the fired article. The present invention contemplates all of these conditions, and the term "intersticial glassy cementing phase" has been used in the claims to cover them, whether this phase is a minor portion of or wholly constitutes what is normally termed the bond in the fired article.

Throughout the specification and claims, the term "ceramic bond" has been used in its broadest sense as referring to the raw bond materials and final product developed therefrom that are chiefly comprised of inorganic oxides of the type and character herein described, whether derived from natural earthy materials or compounded synthetically, and in the development of which the application of heat is an essential factor. The temperature for developing the bond will depend upon the nature of the ceramic bond constituent employed; and for the ordinary types of bonds this will be above a dark red heat, which is in the vicinity of 650° C., or under temperature conditions at which the intersticial glassy cementing phase may be formed.

In view of the above explanation, it will be appreciated that various other products besides grinding wheels may be made in accordance with this invention, although the examples have been directed to the manufacture of abrasive articles. In each case, the bond will be selected of such a type as to satisfy the particular requirements. For example, a refractory plate intended to stand a high temperature will be made of a bond capable of resisting that temperature. Tiles and various anti-slipping, wear-resisting articles will be made of such bonds as will give the desired resistance to abrasion as well as the shocks and wear of pedestrian traffic; while a porous article, such as a filter or diaphragm, will be made to have a desired porosity and mechanical strength. In each case, that bond will be selected which will adhere properly to the granular material and cement it together under the required kiln temperature and firing conditions.

It is to be understood that the term "abrasive article" as used herein is intended to cover all of the various articles, as herein exemplified, which are capable of being made of the materials and according to the procedure herein specified, whether such products are used for abrasive or any other purposes. Likewise, such terms as "refractory granular material" are intended to cover those granular materials which are sufficiently refractory to withstand the heat treatment required to develop the bond, such as the highly refractory alumina, corundum, silicon carbide and other refractory carbides, zirconia, magnesia, etc., as well as the lesser refractory materials, including garnet, quartz, emery, and similar minerals capable of use in the arts. The term "phosphoric oxide" has been used herein to designate all of the phosphorus containing materials which are suitable for use in the process, and without reference to the actual chemical condition of the raw material or the matured bond containing the phosphorus compound. It is assumed for the sake of simplicity of explanation that the aluminum and phosphorus are present in the matured bond as simple oxides, whatever may be the true condition of the bond.

Having thus described our invention, what we claim as new and desire to secure by Letters Patents is:

1. An abrasive article comprising refractory granular material and a ceramic silicate bond that includes at least 1% of phosphoric oxide and alumina in its chemical composition, and in which the bond has been developed by heat.

2. An abrasive article of refractory granular material and a ceramic bond, the chemical composition of which bond comprises ceramic constituents including silica, at least 1% by weight of phosphoric oxide, and alumina in proportion at least equal to the molecular ratio of one gram molecular weight of alumina to one gram molecular weight of phosphoric oxide, and in which the bond has been developed by heat.

3. An abrasive article of ceramic bonded granular material comprising refractory granules and a bond, the ingredients of which bond in the raw state comprise compounds containing alumina and the phosphate and silicate radicals, the phosphoric oxide content comprising at least 10% of the total bond and which has been fired to develop an intersticial glassy cementing phase in intimate association with and uniting the granular material into an integral body.

4. An abrasive article of ceramic bonded granular material comprising refractory granules and a bond, the ingredients of which bond in the raw state comprise compounds containing alumina and the phosphate and silicate radicals, said bond containing at least 1% by weight of phosphoric oxide and alumina in proportion at least equal to the molecular ratio of one gram molecular weight of alumina to one gram molecular weight of phosphoric oxide, and which article has been fired to develop an intersticial glassy cementing phase in intimate association with and uniting the granular material into an integral body.

5. An abrasive article of ceramic bonded granular material comprising refractory granules and a bond, the chemical composition of which bond includes calcium oxide, alumina, silica and phosphoric oxide, the latter being present in amount greater than sufficient to form tricalcium phosphate with all of the calcium present.

6. An article of refractory granular material and a bond developed in intimate association therewith, which bond comprises chemical bond constituents of a ceramic nature including silica, at least 1% by weight of phosphoric oxide, at least sufficient alumina to satisfy the phosphoric oxide in ratio corresponding to aluminium phosphate, and the molecular ratio of $P_2O_5$ to any CaO present in the bond being greater than one to three.

7. An abrasive article comprising ceramic bonded granular aluminous abrasive material, the chemical composition of which bond comprises silica and at least 1% by weight of phosphoric oxide, and in which the latter is present in amount sufficient to form aluminium phosphate with any available alumina present, and which contains sufficient silica to provide an intersticial glassy cementing phase and unite the grains into an integral body.

8. A fired abrasive article comprising aluminous abrasive grains held together by a ceramic bond, the chemical composition of which bond comprises silica, at least 1% by weight of phosphoric oxide, at least sufficient aluima to satisfy the phosphoric acid in the molecular ratio of one gram molecular weight of $Al_2O_3$ to one gram molecular weight of $P_2O_5$, and boric oxide.

9. An abrasive article comprising aluminous abrasive grains held together by a ceramic bond, the chemical composition of which bond comprises silica, at least 1% by weight of phosphoric oxide, at least sufficient alumina to satisfy the phosphoric oxide in the molecular ratio of one gram molecular weight of $Al_2O_3$ to one gram molecular weight of $P_2O_5$, alkali and alkaline earth fluxes, and boric oxide, the molecular ratio of $P_2O_5$ to any CaO present in the bond being greater than one to three, said bond and article being substantially unaffected by water.

10. A ceramic bonded article comprising coarse crystalline alumina granules bonded by a ceramic bond which contains at least 1% by weight of phosphoric oxide and at least sufficient alumina to saturate the phosphoric oxide as aluminum phosphate and prevent material attack on the coarse crystalline alumina granules, together with siliceous ingredients, whereby an intersticial glassy cementing phase is formed.

11. An abrasive article comprising refractory abrasive grains cemented together by a ceramic bond developed by a heat treatment not exceeding standard pyrometric cone 13, which contains silica, phosphoric oxide in amount greater than 1% by weight, and sufficient alumina to at least saturate the phosphoric oxide, said bond having a low modulus of elasticity and being substantially insoluble in water, non-volatile at the temperature of firing, chemically stable and devoid of deleterious crystallization and containing an intersticial glassy cementing phase uniting the grains into an integral body.

12. The method of making an abrasive article of bonded granular material comprising the steps of mixing refractory granules with bond ingredients comprising substances that contain phosphoric oxide, alumina and silica, the phosphoric acid content being at least 1% of the total bond shaping an article therefrom, and developing an intersticial glassy cementing phase by heating the article so as to bond the refractory granules together.

13. The method of making an abrasive article comprising the steps of mixing refractory granular material with glass of a chemical composition including at least 1% of phosphoric oxide, alumina and silica, shaping an article therefrom and developing the bond by heating the article so as to cause the glass to soften and constitute an essential part of the intersticial glassy cementing phase that is present in the bond holding the refractory granules together.

14. The method of making an abrasive article comprising the steps of mixing refractory granular material with bond ingredients comprising clay and substances that contain phosphoric oxide in amount greater than 1% by weight of the bond, shaping an article therefrom and developing an intersticial glassy cementing phase by heating the article so as to bond the refractory granules together.

15. The method of making an article of ceramic bonded granular material comprising the steps of mixing refractory granular material with bond ingredients comprising substances containing phosphoric oxide, alumina and silica, the total ingredients of said bond containing a proportion of alumina and phosphoric oxide having a molecular ratio of at least one gram molecular weight of $Al_2O_3$ to one gram molecular weight of $P_2O_5$ and containing a proportion of phosphoric oxide having a molecular ratio of more than one gram molecular weight of $P_2O_5$ to three gram molecular weight of any CaO that may be present in the bond, shaping an article therefrom, and developing a glassy intersticial cementing phase by heating the article so as to bond the refractory granules together.

16. The method of making an abrasive article comprising the steps of mixing refractory granular material with bond ingredients comprising clay, feldspar, and substances containing at least 1% of phosphoric oxide, alumina and boric oxide, shaping an article therefrom, and developing a glassy intersticial cementing phase by heating the article so as to bond the refractory granules together.

17. The method of making an abrasive article comprising the steps of mixing aluminous abrasive grains with bond ingredients comprising materials containing phosphoric oxide, alumina, silica and boric oxide, in which total bond materials the alumina present relative to the phosphoric oxide present is at least equal to the molecular ratio of one gram molecular weight of alumina to one gram molecular weight of phosphoric oxide and the phosphoric oxide present relative to any lime present exceeds the molecular ratio of one gram molecular weight of $P_2O_5$ to three gram molecular weight of CaO, shaping an article therefrom, and developing a glassy intersticial cementing phase by heating the article so as to bond the aluminous grains together.

18. The method of making an abrasive article comprising the steps of mixing aluminous abrasive grains with bond ingredients including clay and comprising materials containing phosphoric oxide, alumina, silica, alkalis, alkaline earths and boric oxide, in which total bond materials the alumina present relative to the phosphoric oxide present is at least equal to the molecular ratio of one gram molecular weight of alumina to one gram molecular weight of phosphoric oxide and the phosphoric oxide present relative to any lime present exceeds the molecular ratio of one gram molecular weight of $P_2O_5$ to three gram molecular weight of CaO, shaping an article therefrom, and developing a glassy intersticial cementing phase by heating the article so as to ceramically bond the aluminous grains together.

LOWELL H. MILLIGAN.
DAVID ARMITAGE.